United States Patent
Andersson et al.

(10) Patent No.: US 9,810,490 B2
(45) Date of Patent: Nov. 7, 2017

(54) DEVICE, METHOD AND PLATE HEAT EXCHANGER

(71) Applicant: ALFA LAVAL CORPORATE AB, Lund (SE)

(72) Inventors: Matz Andersson, Lund (SE); Magnus Nilsson, Dalby (SE); Klas Bertilsson, Eslov (SE)

(73) Assignee: ALFA LAVAL CORPORATE AB, Lund (SE)

( * ) Notice: Subject to any disclaimer, the term of this patent is extended or adjusted under 35 U.S.C. 154(b) by 190 days.

(21) Appl. No.: 14/436,403

(22) PCT Filed: Nov. 29, 2013

(86) PCT No.: PCT/EP2013/075088
§ 371 (c)(1),
(2) Date: Apr. 16, 2015

(87) PCT Pub. No.: WO2014/086677
PCT Pub. Date: Jun. 12, 2014

(65) Prior Publication Data
US 2015/0285574 A1    Oct. 8, 2015

(30) Foreign Application Priority Data
Dec. 5, 2012 (EP) .................... 12195630

(51) Int. Cl.
*G01M 3/28* (2006.01)
*F28F 27/00* (2006.01)
*F28F 3/10* (2006.01)

(52) U.S. Cl.
CPC ............... *F28F 27/00* (2013.01); *F28F 3/10* (2013.01); *G01M 3/28* (2013.01); *F28F 2265/16* (2013.01)

(58) Field of Classification Search
CPC ..................................................... G01M 3/28
(Continued)

(56) References Cited

U.S. PATENT DOCUMENTS

| 4,184,542 A | 1/1980 | Sumitomo |
| 4,372,375 A | 2/1983 | Bond |

(Continued)

FOREIGN PATENT DOCUMENTS

| CN | 1672007 A | 9/2005 |
| CN | 1965221 A | 5/2007 |

(Continued)

OTHER PUBLICATIONS

English version of Japanese Office Action (Notice of Reasons for Rejection) dated Aug. 8, 2016, by the Japanese Patent Office in corresponding Japanese Patent Application No. 2015-545748. (3 pgs).

(Continued)

*Primary Examiner* — Laura Martin
*Assistant Examiner* — Alex Devito
(74) *Attorney, Agent, or Firm* — Buchanan Ingersoll & Rooney PC

(57) ABSTRACT

A device and a method for assessing a gasket pressure of a gasket arrangement between two adjacent heat transfer plates of a plate heat exchanger is provided. The gasket arrangement seals between adjacent heat transfer plates to define a flow channel between adjacent heat transfer plates, and the gasket arrangement is arranged to be exposed to a fluid passing through the flow channel. The device comprises a test object and a holder which are adapted to be arranged in a flow path of the fluid. The holder is arranged to hold the test object and the test object is arranged to be exposed to the fluid. The device is adapted to be arranged outside a space delimited by the adjacent heat transfer plates.

(Continued)

The test object is arranged to be evaluated for an indirect assessment of the gasket pressure of the gasket arrangement.

20 Claims, 3 Drawing Sheets

(58) Field of Classification Search
USPC .............................................................. 73/37
See application file for complete search history.

(56) References Cited

U.S. PATENT DOCUMENTS

| | | | |
|---|---|---|---|
| 4,903,758 | A | 2/1990 | Cowan |
| 5,375,453 | A | 12/1994 | Rudd et al. |
| 7,857,036 | B2 | 12/2010 | Bergqvist et al. |
| 2005/0269058 | A1 | 12/2005 | Tagesson |
| 2009/0315267 | A1 | 12/2009 | Castleman |
| 2013/0284413 | A1 | 10/2013 | Ask et al. |

FOREIGN PATENT DOCUMENTS

| | | |
|---|---|---|
| CN | 101629631 A | 1/2010 |
| DE | 23 57 059 A1 | 5/1975 |
| DE | 103 54 047 A1 | 6/2005 |
| DE | 10 2005 002 408 B3 | 7/2006 |
| EP | 2 138 744 A1 | 12/2009 |
| EP | 2 485 004 A1 | 8/2012 |
| EP | 2 138 744 B1 | 11/2012 |
| GB | 982138 A | 2/1965 |
| GB | 2 104 595 A | 3/1983 |
| JP | 61224839 A | 10/1986 |
| JP | 6-40830 U | 5/1994 |
| JP | 06174579 A | 6/1994 |
| JP | 2000111440 A | 4/2000 |
| JP | 2002323399 A | 11/2002 |
| JP | 2002364749 A | 12/2002 |
| JP | 2005326264 A | 5/2004 |
| JP | 2008501946 A | 1/2008 |
| JP | 2009-264757 A | 11/2009 |
| JP | 2010014448 | 1/2010 |
| WO | 2005/119197 A1 | 12/2005 |
| WO | 2012/104118 A1 | 8/2012 |

OTHER PUBLICATIONS

English language translation of Office Action/Search Report dated Jun. 27, 2016, by the State Intellectual Property Office of China in corresponding Chinese Patent Application No. 201380063546.5. (4 pages).

International Search Report (PCT/ISA/210) dated Jul. 16, 2014, by the European Patent Office as the International Searching Authority for International Application No. PCT/EP2013/075088.

Written Opinion (PCT/ISA/237) dated Jul. 16, 2014, by the European Patent Office as the International Searching Authority for International Application No. PCT/EP2013/075088.

Official Action issued by the Japan Patent Office dated Mar. 6, 2017 in counterpart Japanese Application No. 2015-545748, with English language translation of Official Action (10 pgs).

DEVICE, METHOD AND PLATE HEAT EXCHANGER

TECHNICAL FIELD

The invention relates to a device and a method for assessing a gasket pressure of a gasket arrangement of a plate heat exchanger according to the preamble of claim 1 and claim 10, respectively. The invention also relates to a plate heat exchanger provided with a device like the one above.

BACKGROUND ART

Plate heat exchangers, PHEs, typically consist of two end plates in between which a number of heat transfer plates are arranged in an aligned manner. In one type of well-known PHEs, the so called gasketed PHEs, gaskets are arranged between the heat transfer plates. The end plates, and therefore the heat transfer plates, are pressed towards each other whereby the gaskets seal between the heat transfer plates. The gaskets define parallel flow channels between the heat transfer plates through which channels two fluids of initially different temperatures alternately can flow for transferring heat from one fluid to the other. Typically, the gaskets are made of a resilient material, such as rubber.

Arranged inside a PHE, the gaskets are subjected to a number of different outer conditions that may affect the gasket material and gradually impair the gasket pressure and thus the sealing capacity of the gaskets. For example, the gaskets may be subjected to oxygen, more or less aggressive chemicals, relatively high as well as low temperatures, and compression forces. Also, time may affect the sealing capacity of the gaskets negatively. As the sealing capacity of the gaskets deteriorates, the risk of leaking flow channels increases. Therefore, the gaskets of the PHE should be replaced occasionally. It is important to know when it is suitable to replace the gaskets. Naturally, it is desirable to use the gaskets as long as possible but not for so long that a flow channel leakage arise.

From U.S. Pat. No. 7,857,036 a method and a device for assessing and detecting the risk of fluid leakage in a heat exchanger due to worn-out gaskets are known. Herein, a sensor is situated on one of the heat transfer plates, under the associated gasket which defines a fluid channel between said heat transfer plate and an adjacent heat transfer plate. The sensor monitors the pressure between said heat transfer plate and the gasket. Further, another sensor is located along the flow path of the fluid to the heat exchanger and it monitors the pressure of the incoming fluid. The pressures measures by the two sensors are used to assess the risk of leakage in the heat exchanger. However, the presence of a sensor under the gasket may have an effect on the gasket and its sealing capacity.

SUMMARY

An object of the present invention is to provide a device and a method for monitoring a gasket pressure, and thus a sealing capacity, of a gasket arrangement of a PHE that do not affect the gasket arrangement. The basic concept of the invention is to make an indirect assessment of the condition of the gasket arrangement by evaluating the condition of a test object. Another object of the present invention is to provide a PHE provided with the above device. The device, PHE and method for achieving the objects above are defined in the appended claims and discussed below.

A device according to the invention is arranged to assess a gasket pressure of a gasket arrangement between two adjacent heat transfer plates of a PHE. The gasket arrangement seals between the adjacent heat transfer plates to define a flow channel between them and it is arranged to be exposed to a fluid passing through the flow channel. The device is characterized in that it comprises a test object and a holding means which are adapted to be arranged in a flow path of the fluid. The holding means is arranged to hold the test object and the test object is arranged to be exposed to the fluid. Further, the device is adapted to be arranged outside a space delimited by the adjacent heat transfer plates. Further, the test object is arranged to be evaluated for an indirect assessment of the gasket pressure of the gasket arrangement.

By gasket arrangement is meant all gaskets between said adjacent heat transfer plates. Thus, the gasket arrangement may contain one or more gaskets. As a typical example, the gasket arrangement may contain one field gasket and two ring gaskets, as is well known within the art.

Besides being exposed to said fluid, the gasket arrangement is subjected to a number of other specific outer conditions. By outer conditions is meant conditions prevailing on the outside of the gasket arrangement. For example, said specific outer conditions may involve certain temperatures, exposure to oxygen and/or chemicals and compression and de-compression. The outer conditions may, or may not be, constant over time. To enable a more accurate gasket pressure assessment, also the test object may be subjected to one or more of said other specific conditions, as will be further discussed below.

The gasket pressure of the gasket arrangement is one of the factors that may determine whether the PHE is leaking or not. When the gasket arrangement is new, it is typically associated with a relatively high gasket pressure. In course of time, the gasket pressure and thus the sealing capacity of the gasket arrangement decreases, which means that the risk of a PHE leakage increases. By monitoring the gasket pressure of the gasket arrangement, it is possible to see when a gasket arrangement replacement is suitable, which in turn may decrease the risk of a PHE leakage.

By the device being adapted for arrangement in connection to the heat exchanger, i.e. in a flow path of said fluid, it may be assured that it is automatically subjected to at least partly the same environment as the gasket arrangement. Thus, less or no separate equipment for simulating the actual environment of the gasket arrangement is required. Since the test object is adapted to be arranged separately from the gasket arrangement, the gasket arrangement may be completely unaffected by the assessment operation.

Since both the gasket arrangement and the test object are exposed to said fluid, the environment of the test object may be similar to the environment of the gasket arrangement which may enable an accurate gasket pressure assessment.

The space or volume delimited by the adjacent heat transfer plates may or may not be continuous across the heat transfer plates since these may or may not be arranged to contact or abut against each other. In either case, by said space or volume is meant anywhere between the adjacent heat transfer plates, i.e. within an outer periphery and outside any openings, e.g. port openings, of the adjacent heat transfer plates.

If the conditions of the gasket arrangement and test object are to be assumed to be the same, which could facilitate the gasket pressure assessment, it is beneficial if the test object and the gasket arrangement have essentially the same properties. For example, the test object and the gasket arrangement may advantageously be of the same material. Accordingly, the test object may be resilient. Further, the test object may be arranged to be clamped between a first and a second surface which would resemble the outer specific condition that the gasket arrangement is clamped between said two adjacent heat transfer plates.

The test object may be evaluated in different ways, for example visually, for the indirect assessment of the gasket pressure. However, to enable a relatively accurate evaluation, and thus gasket pressure assessment, the device may comprise a first sensor arranged to monitor a first pressure between the test object and the first surface. The first pressure may be used for the indirect assessment of the gasket pressure of the gasket arrangement. Additionally, to enable an even more accurate gasket pressure assessment, the device may further comprise a second sensor arranged to monitor a second pressure of said fluid in said flow path. A difference between the first pressure and the second pressure may be used for the indirect assessment of the gasket pressure of the gasket arrangement.

Said holding means may comprise a cage arranged to house the test object, wherein the above referenced first and second surfaces are comprised in a top and a bottom, respectively, of the cage. Further, the cage may comprise at least one opening in a side wall extending between the top and the bottom of the cage. Such a cage enables mechanically simple clamping and simultaneously exposure of the test object.

The device may be adapted to be arranged inside the PHE, such as in a port of the PHE. Alternately, the device may be adapted to be arranged outside the PHE. As an example, the device may be adapted to be at least partly arranged inside, and engage with, a feed pipe in flow communication with the PHE. The feed pipe may be an infeed pipe leading to, or an outfeed pipe leading from, the PHE. Further, the feed pipe may feed the above referenced fluid to/from the PHE. The fact the device engages with the feed pipe enables stable positioning of the test object inside the feed pipe.

The device may comprise a seat arranged to house the test object and a tightening means arranged to be partly received in, and engage with, the seat to form the cage and clamp the test object between the first and second surfaces being comprised in the seat and the tightening means, respectively. Thus, here, the seat and the tightening means together form the cage.

Further, the device may be arranged to be inserted into the feed pipe through a connection in a wall of the feed pipe, whereby the tightening means is arranged to engage with the connection. Thereby, the device may be easily accessible from the outside of the feed pipe which is beneficial when it comes to replacement of device components and/or repairs.

A plate heat exchanger according to the present invention is provided with a device as described above.

Thus, a plate heat exchanger according to the present invention comprises a number of heat transfer plates aligned in a plate pack and a gasket arrangement arranged between two adjacent ones of the heat transfer plates. The gasket arrangement seals between the adjacent heat transfer plates to define a flow channel between them and it is arranged to be exposed to a fluid passing through the flow channel. The plate heat exchanger further comprises a device arranged to assess a gasket pressure of the gasket arrangement, which device is arranged outside a space delimited by the adjacent heat transfer plates. The device comprises a test object and a holding means which are adapted to be arranged in a flow path of the fluid. The holding means is arranged to hold the test object and the test object is arranged to be exposed to said fluid. Further, the test object is arranged to be evaluated for an indirect assessment of the gasket pressure of the gasket arrangement.

A method according to the invention is for assessing a gasket pressure of a gasket arrangement between two adjacent heat transfer plates of a plate heat exchanger. The gasket arrangement seals between said adjacent heat transfer plates to define a flow channel between the adjacent heat transfer plates. Further, the gasket arrangement is subjected to a number of specific outer conditions. The method is characterized in that it comprises the step of providing a test object separated from the gasket arrangement, but in connection to the heat exchanger, to subject it to at least one of said specific outer conditions. Further, the method comprises the step of evaluating the test object to indirectly assess the gasket pressure of the gasket arrangement.

The method may comprise the step of clamping the test object between a first and a second surface.

The method may comprise the step of monitoring a first pressure between the test object and the first surface and using the first pressure to indirectly assess the gasket pressure of the gasket arrangement.

The method may comprise the step of monitoring a second pressure of a media at least partly surrounding the test object and using a difference between the first pressure and the second pressure to indirectly assess the gasket pressure of the gasket arrangement.

Depending on the intended arrangement of the test object, the media at least partly surrounding the test object may be the fluid passing through the flow channel of the PHE.

In connection with the inventive method, the device may be adapted to be arranged inside the PHE, such as in a port of the PHE or between said adjacent heat transfer plates, within or outside the gasket arrangement, wherein the first and second surfaces would be comprised in a respective one of said two adjacent heat transfer plates.

Alternately, the device may be adapted to be arranged outside the PHE. For example, the method may comprise providing the test object at least partly arranged inside a feed pipe of a fluid passing through the plate heat exchanger to expose it to the fluid, the feed pipe being in flow communication with the plate heat exchanger, and the test object being insertable into the feed pipe through a connection in a wall of the feed pipe.

The above discussed advantages with the different embodiments of the inventive device is naturally transferable to the inventive plate heat exchanger and the inventive method.

Still other objectives, features, aspects and advantages of the invention will appear from the following detailed description as well as from the drawings.

BRIEF DESCRIPTION OF THE DRAWINGS

The invention will now be described in more detail with reference to the appended schematic drawings, in which.

DETAILED DESCRIPTION

Figure 1:
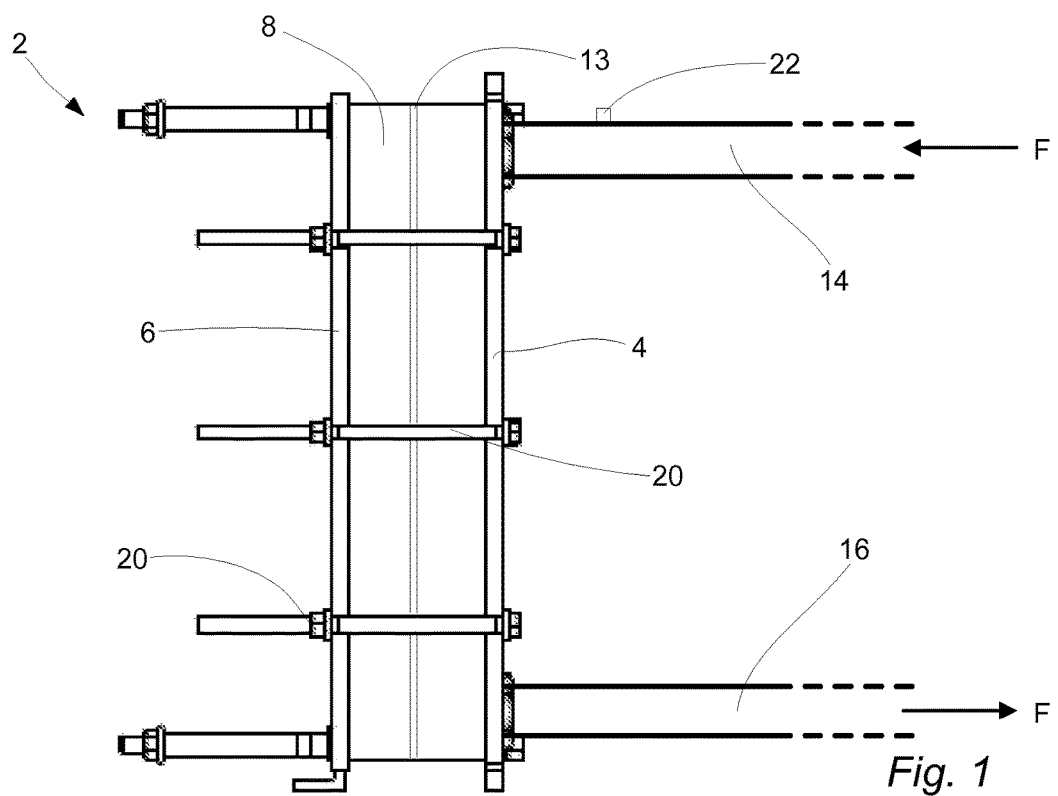
FIG. 1 is a schematic side view of a PHE provided with a device for gasket pressure assessment and connected to infeed and outfeed pipes.
Figure 2:
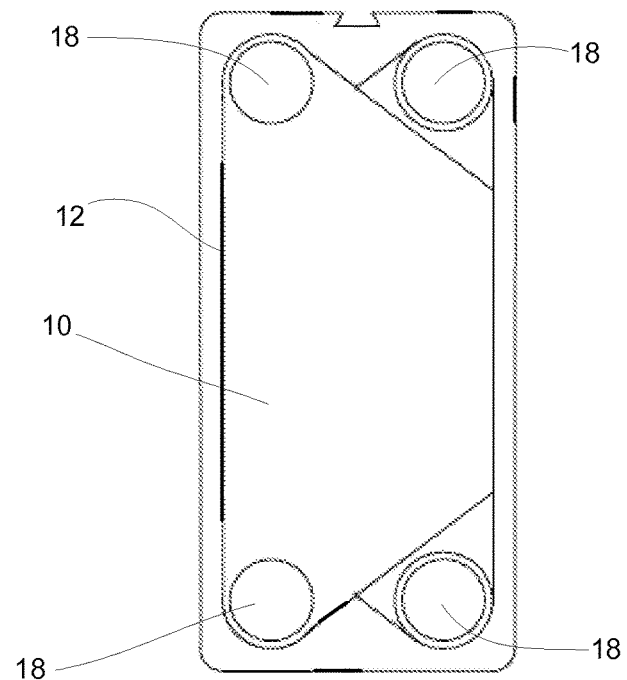
FIG. 2 is a plan view schematically illustrating a heat transfer plate of the PHE of FIG. 1.
Figure 3:
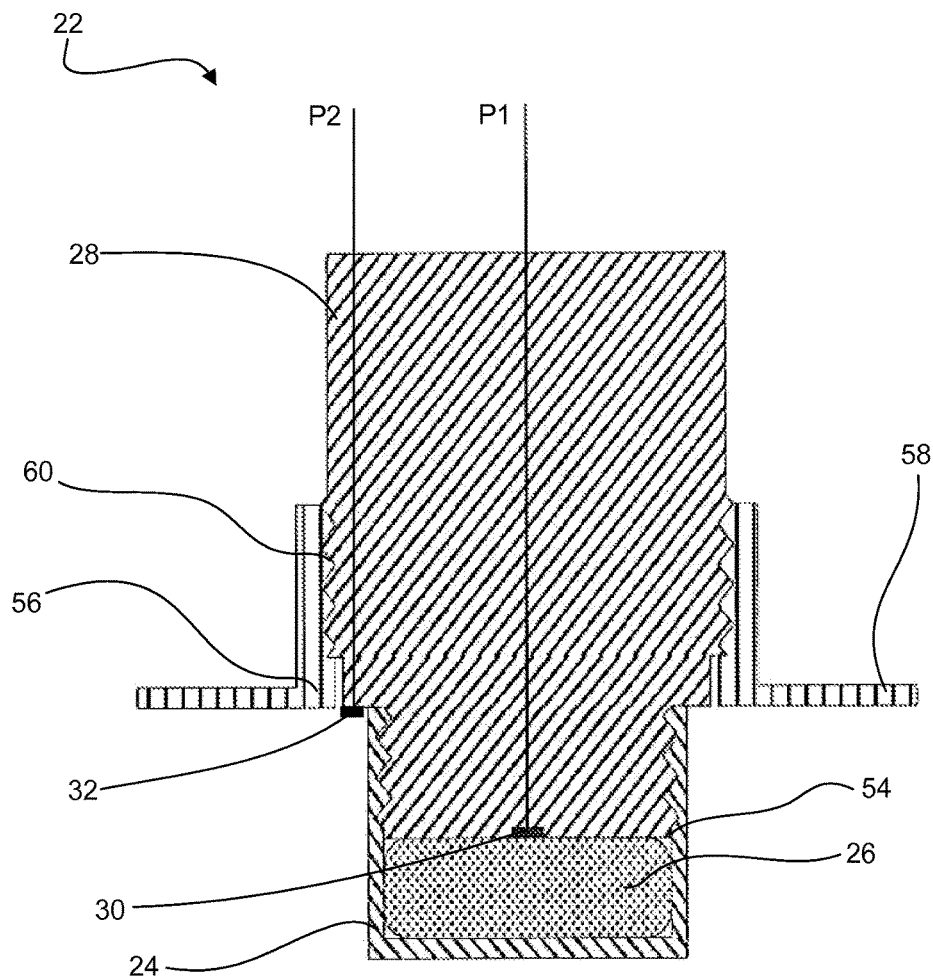
FIG. 3 schematically illustrates a cross section of the device for gasket pressure assessment of FIG. 1.
Figure 4:
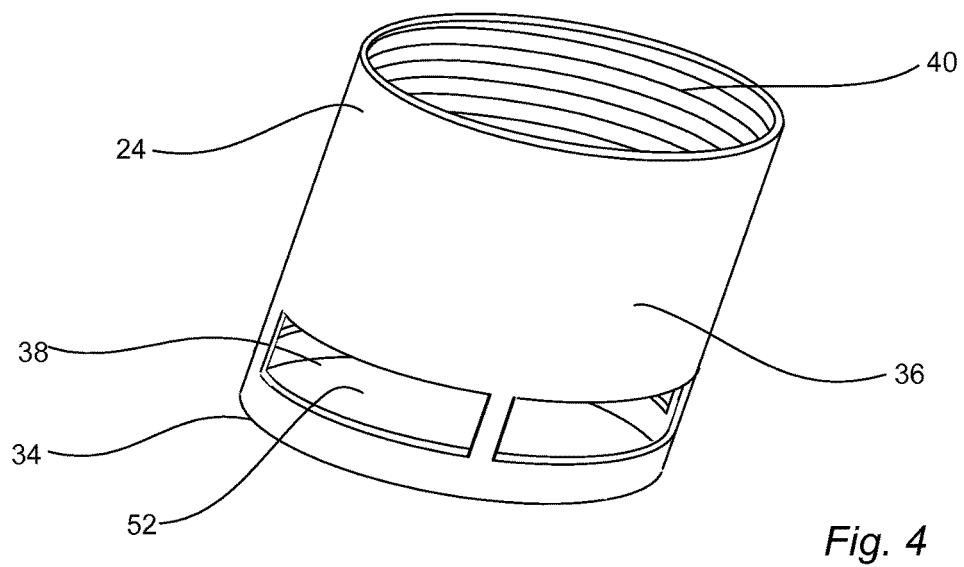
FIG. 4 is a schematic perspective view of a component, in the form of a seat, of the device of FIG. 3.
Figure 5:
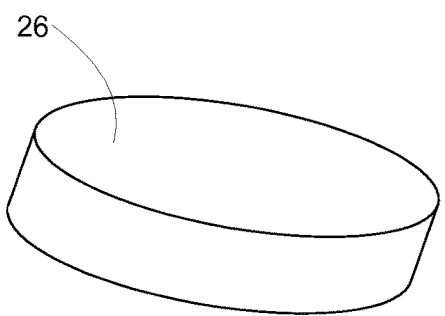
FIG. 5 is a schematic perspective view of a component, in the form of a test object, of the device of FIG. 3.
Figure 6:
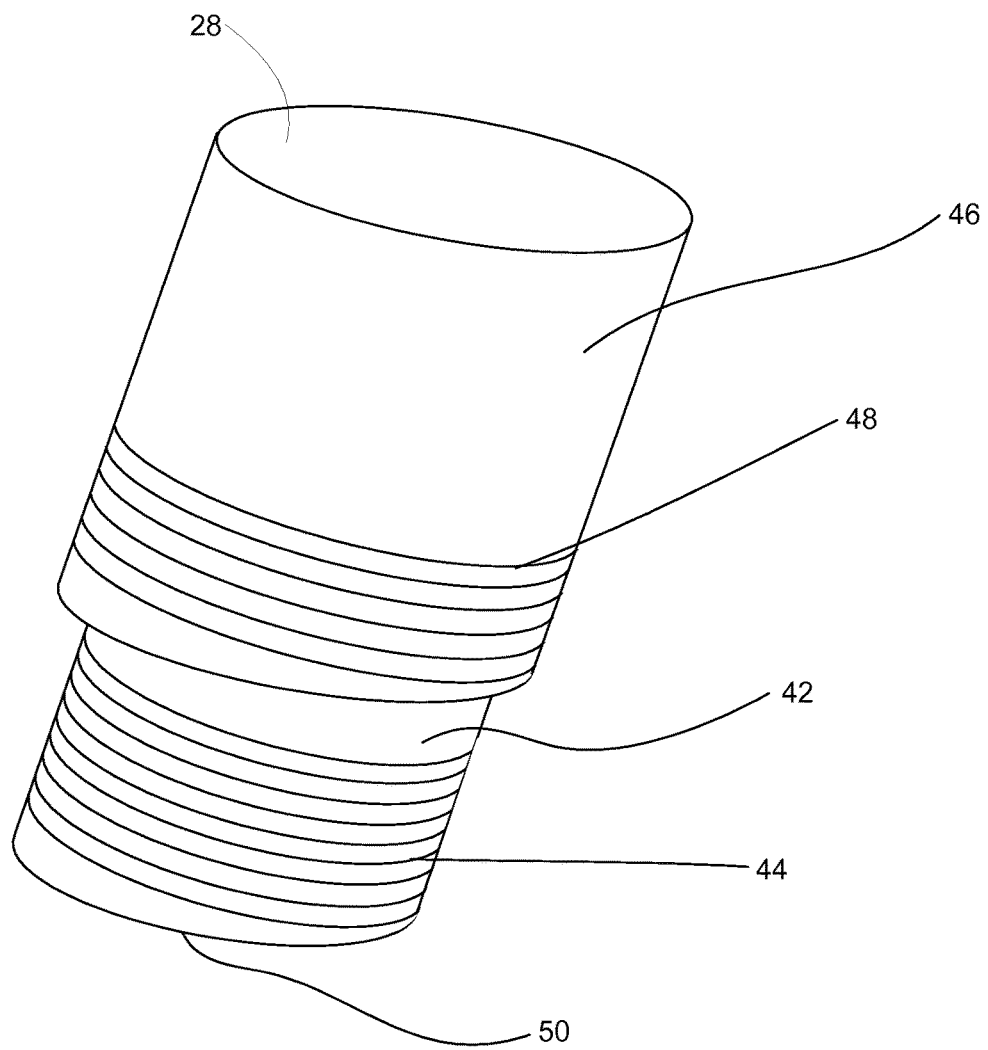
FIG. 6 is a schematic perspective view of a component, in the form of a tightening means, of the device of FIG. 3.

With reference to FIG. 1, a gasketed PHE 2 is shown. It comprises a first end plate 4, a second end plate 6 and a pack 8 of aligned corrugated stainless steel heat transfer plates 10 arranged between the first and second end plates 4 and 6, respectively. One of these heat transfer plates 10 is illustrated in FIG. 2. The heat transfer plates are separated from each other by gasket arrangements 12, one gasket arrangement being arranged between each two adjacent heat transfer plates. One of these gasket arrangements is illustrated in FIG. 2. Each gasket arrangement contains one gasket only working both as field and ring gasket. Therefore, hereinafter, gasket arrangement will be referred to as just gasket.

Each pair of heat transfer plates delimits a space or volume. One such space is denoted 13 and schematically illustrated in FIG. 1. Further, the heat transfer plates together with the gaskets define parallel flow channels arranged to receive two fluids for transferring heat from one fluid to the other. To this end, a warmer first fluid is arranged to flow in every second flow channel and a cooler second fluid is arranged to flow in the remaining flow channels. The first fluid is fed to and from the PHE 2 through an infeed pipe 14 and an outfeed pipe 16, respectively. Similarly, the second fluid is fed to and from the PHE 2 through an infeed pipe and an outfeed pipe (not shown), respectively. The infeed and outfeed pipes are aligned with port holes 18 of the heat transfer plates 10. The port holes 18 form ports of the PHE 2 which communicate with the infeed and outfeed pipes to feed the first and second fluids through the flow channels. For the flow channels to be leak proof, the heat transfer plates must be pressed against each other whereby the gaskets seal between the heat transfer plates. To this end, the PHE 2 comprises a number of traction means 20 arranged to press the first and second end plates 4 and 6, respectively, towards each other.

The gaskets 12, which are made of rubber, are subjected to specific outer conditions, or a certain environment, when the PHE 2 is operating. More particularly, the gaskets defining the flow channels of the first fluid are subjected to air exposure from an outside, first fluid exposure from a inside and a pressure from an upper side and an underside. The first fluid has a first temperature T1 and certain chemical properties. Similarly, the gaskets defining the flow channels of the second fluid are subjected to air exposure from an outside, second fluid exposure from a inside and a pressure from an upper side and an underside. The second fluid has a second temperature T2, wherein T1>T2, and certain chemical properties which are equally or less harsh than the chemical properties of the first fluid. As is conventionally known, the aging of rubber, and thus the gaskets, is affected by the surrounding environment. High temperatures, air and chemicals exposure and compression are typical outer conditions that may speed up the aging. With aging of the gaskets comes decreased resilience and thus impaired sealing capacity.

New gaskets in a PHE are typically associated with relatively high gasket pressure and thus good sealing capacity. However, aging of the gaskets is typically associated with decreasing gasket pressure and thus sealing capacity. The gaskets should be replaced before the gasket pressure becomes too low, i.e. before the gaskets start to leak. In view of this, the PHE is provided with a device 22 for assessing the gasket pressure of the gaskets 12 of the PHE 2. The device 22 is illustrated in further detail in FIGS. 3, 4, 5 and 6. It comprises a seat 24, a test object 26, a tightening means 28, a first sensor 30 and a second sensor 32. The seat 24 is made of the same material as the heat transfer plates 10, i.e. stainless steel. It comprises a circular perforated base 34 and a circular cylinder shaped wall 36 extending from the base. The cylinder shaped wall 36 is provided with windows 38 and an internal wall thread 40. The test object 26 is made of the same material as the gaskets 12, i.e. rubber. It has a form corresponding to an inside of the seat 24, more particularly, the form of a circular cylinder. The tightening means 28 is made of stainless steel, i.e. the same material as the heat transfer plates and the seat 24. It comprises a first part 42 having a form corresponding to the inside of the seat 24, i.e. the form of a circular cylinder, and a first external thread 44. Further, it comprises a second part 46 having the form of a larger circular cylinder and a second external thread 48. The test object 26 is arranged to be received in the seat 24 before the tightening means 28 is screwed into the seat, the internal thread 40 engaging with the first external thread 44, to clamp the test object between a first surface 50 and a second surface 52. The first surface 50 is comprised in the first part 42 of the tightening means 28 while the second surface 52 is comprised in the base 34 of the seat 24. Thus, the seat and the tightening means together form a holding means in the form of a cage 54 housing the test object 26, which cage has a bottom comprised in the base 34, a top comprised in the first part 42 of the tightening means 28, a side wall comprised in the cylinder shaped wall 36 and openings in the form of the windows 38. The first and second sensors 30 and 32, respectively, are commercially available pressure sensors. The first sensor 30 is arranged between the test object 26 and the tightening means 28, more particularly the first surface 50, to measure the pressure there between. The second sensor 32 is arranged on the outside of the device to measure the pressure of the surroundings.

The device 22 is arranged outside the PHE 2 but still in connection thereto. More particularly, the device 22 is arranged at the infeed pipe 14. The infeed pipe 14 comprises a connection 56 (FIG. 3) in a pipe wall 58 of it, an inner form of the connection 56 corresponding to the form of the second part 46 of the tightening means 28. The device 22 is arranged to be inserted into the connection 56 and engage therewith by the second part 46 of the tightening means 28 being screwed into the connection. In view thereof, the connection 56 comprises an internal connection thread 60 arranged to engage with the second external thread 48. Arranged like that, the cage 54, and therefore the test object 26, will be arranged inside the infeed pipe 14. Thus, the test object and the cage will be arranged in a flow path F (FIG. 1) of the first fluid, which flow path F leads through the infeed pipe 14, through every second flow channel of the PHE 2 and through the outfeed pipe 16. Since the cage 54 is provided with openings, the test object 26 will thereby be exposed to the first fluid, just like the gaskets 12 in the first fluid flow channels of the PHE 2.

Hereinafter, the use of the device 22 will be described. When the PHE is assembled, the traction means 20 are tightened until a preset distance, depending i.e. on number and type of heat transfer plates and gaskets, between the end plates 4 and 6 is obtained. This will result in a specific gasket pressure, i.e. a specific pressure between gasket and heat transfer plate, inside the PHE. Further, the tightening means 28 is tightened to such an extent that the same specific pressure is obtained between the test object 26 and the tightening means. During operation of the PHE 2, every second gasket 12 inside the PHE, just like the test object 26 of the device 22, is exposed to the first fluid. This first fluid exposure will age both the gaskets 12 and the test object 26 and the invention is based on the approximation that the aging of the gaskets and the test object is essentially the same. Further, the gasket pressure of the gaskets inside the PHE is monitored indirectly by monitoring a test object pressure, i.e. an object pressure PO exerted on the tightening means as a result of only the clamping of the test object, since the gasket pressure is regarded as being essentially equal to the object pressure PO. In course of time, as the test object 26 ages, the pressure PO will gradually decrease. When PO reaches a certain limit, this is a signal the gaskets of the PHE should be replaced. In connection with gasket replacement, also the test object should be replaced.

The first and second sensors 30 and 32 are used to monitor the object pressure PO. More particularly, the first sensor 30 monitors a first pressure P1 between the test object 26 and the tightening means 28. Before the device is inserted into the infeed pipe 14, PO=P1. However, when the device 22 engages with the connection 56 as described above, also the first fluid will exert a pressure, a second pressure P2, on the tightening means 28. This second pressure P2 is monitored by the second sensor 32. Thus, in normal operation of the PHE, the following relationship is valid: PO=P1−P2.

The output of the first and second sensors are processed in some kind of commercially available processing unit which is not illustrated in the drawings nor further described herein.

Thus, the invention relates to a method for assessing a gasket pressure of a gasket arrangement (12) between two adjacent heat transfer plates (10) of a PHE (2). The gasket arrangement seals between said adjacent heat transfer plates to define a flow channel between them and it is arranged to be exposed to a first fluid passing through the flow channel. The method comprises the step of providing a test object (26) and a holding means (54) outside a space (13) delimited by the adjacent heat transfer plates and in a flow path (F) of the first fluid, the holding means holding the test object, to expose the test object to the first fluid. Further, the method comprises the step of evaluating the test object to indirectly assess the gasket pressure of the gasket arrangement.

The above described embodiments of the present invention should only be seen as examples. A person skilled in the art realizes that the embodiments discussed can be varied in a number of ways without deviating from the inventive conception.

For example, the device need not be arranged outside the PHE. Alternately, it could be arranged inside the PHE, e.g. inside a port of the PHE. Also, in connection with the inventive method, the device could be arranged between two adjacent heat transfer plates, either within or outside the gasket, i.e. in or outside the first fluid flow path.

Further, visual inspection of the test object could be used instead of or in addition to pressure sensors to evaluate the condition of the PHE gaskets.

The following relationship is typically valid for the above described embodiment: P2<<PO. Thus, according to an alternative embodiment the second pressure sensor could be omitted and P1 could be regarded as a sufficiently accurate measure of the gasket pressure inside the PHE. In such an embodiment the base of the seat could be made solid instead of perforated.

Instead of being perforated, the base could comprise a porous material. Further, to imitate the environment inside the PHE as much as possible, a metal sheet could be arranged between the test object and the porous base.

The gaskets inside the PHE is exposed, not only to the first and second fluids, but also to air. To imitate the environment of the gaskets even further, also the test object could be arranged to be exposed to air. As an example, the cage could have an alternative design so as to enable for an air pocket to be present in connection to the test object.

The tightening means and/or the seat need not be made of the same material as the heat transfer plates. Further, the tightening means and/or the seat and/or the heat transfer plates may be of other materials than stainless steel. Similarly, the test object need not be made of the same material as the gaskets inside the PHE. Further, the test object and/or the gaskets may be of other materials than rubber. Also, the device, and thus the different components of it, may be designed in other ways. As an example, the device need not have circular cylindrical forms.

Above, the tightening means is screwed into the seat to clamp the test object. Naturally, the screwing is relative which means that the seat instead could be screwed onto the tightening means. Further, the tightening means and the seat could be arranged to engage with each other in other ways, such as by some kind of snap or bayonet engagement.

In the above described embodiment, the device is arranged in the flow path of the first fluid which is the hottest and chemically most harsh fluid and therefore speeds up the aging of the gaskets more than the second fluid does. Further, the device is arranged in the infeed pipe since the first fluid is at its hottest there. Naturally, the device could instead be arranged in the outfeed pipe of the first fluid. Furthermore, it would of course be possible to arrange the device in a flow path of the second fluid instead, for example in the second fluid infeed or outfeed pipe. Naturally, the device could also be used in connections where the first and second fluids have other features than stated above. As an example, the first fluid could be more harsh but have a lower temperature than the second fluid, and vice versa. Additionally, it would be possible to have more than one device, for example one arranged in the first fluid flow path and another arranged in the second fluid flow path.

The openings of the above cage have a size adapted to the size, more particularly the height, of the test object. Of course, the openings could be both larger and smaller. Larger openings could be provided in a "universal" cage adapted to receive test objects of different heights. In such a "universal" cage, the tightening means could be arranged to partially close the openings when a test object of small height is received in the cage.

The first and second sensors could be arranged in other ways than described above and illustrated in the drawings. As an example, instead of being attached to the tightening means, the second sensor could be attached to the seat somewhere or to the inside of the infeed pipe.

The purpose of the holding means is to hold or fix the test object in the right position. The above described device comprises a holding means in the form of a cage which is also exposed to the first fluid. However, the holding means could be designed in many other ways. As an example, the holding means could be designed as a needle arranged to be surrounded by the test object so as to not be exposed to the first fluid. As another example, the holding means could comprise a plate or similar corresponding to the base 34 of the seat 24 and a needle attached to a center of the plate and arranged to protrude through the test object and engage with the pipe, whereby the plate and the needle could cooperate to clamp the test object between the plate and an inside of the pipe wall.

Finally, the present invention could be used in connection with other types of PHEs than pure gasketed ones, such as PHEs comprising both permanently joined heat transfer plates and heat transfer plates separated by gaskets, so-called semi-welded PHEs.

It should be stressed that the attributes first, second, etc. are used herein just to distinguish between species of the same kind and not to express any kind of mutual order between the species.

It should be stressed that a description of details not relevant to the present invention has been omitted and that the figures are just schematic and not drawn according to scale. It should also be said that some of the figures have been more simplified than others. Therefore, some components may be illustrated in one figure but left out on another figure.

The invention claimed is:

1. A device for assessing a gasket pressure of a gasket arrangement between two adjacent heat transfer plates of a plate heat exchanger, said gasket arrangement sealing between said adjacent heat transfer plates to define a flow channel between said adjacent heat transfer plates, and said gasket arrangement being arranged to be exposed to a fluid passing through the flow channel, the device comprising
   a test object and a holder configured to be arranged in a flow path of said fluid, the holder being configured to hold the test object while the test object is exposed to said fluid,
   the device being configured to be arranged outside said adjacent heat transfer plates, and
   the test object being configured to be evaluated for an indirect assessment of the gasket pressure of the gasket arrangement.

2. A device according to claim 1, wherein the test object is resilient and arranged to be clamped between a first and a second surface.

3. A device according to claim 2, further comprising a first sensor arranged to monitor a first pressure between the test object and the first surface, which first pressure is to be used for the indirect assessment of the gasket pressure of the gasket arrangement.

4. A device according to claim 3, further comprising a second sensor arranged to monitor a second pressure of said fluid in said flow path, wherein a difference between the first pressure and the second pressure is to be used for the indirect assessment of the gasket pressure of the gasket arrangement.

5. A device according to claim 2, wherein said holder comprises a cage arranged to house the test object, wherein said first and said second surface is comprised in a top and a bottom, respectively, of the cage and wherein the cage comprises at least one opening in a side wall extending between the top and the bottom of the cage.

6. A device according to claim 5, adapted to be at least partly arranged inside, and engage with, a feed pipe in flow communication with the plate heat exchanger.

7. A device according to claim 6, comprising a seat arranged to house the test object and a tightening means arranged to be partly received in, and engage with, the seat to form the cage and clamp the test object between the first and second surfaces being comprised in the seat and the tightening means, respectively.

8. A device according to claim 7, arranged to be inserted into the feed pipe through a connection in a wall of the feed pipe, the tightening means being arranged to engage with the connection.

9. A plate heat exchanger provided with a device according to claim 1.

10. A method for assessing a gasket pressure of a gasket arrangement between two adjacent heat transfer plates of a plate heat exchanger, said gasket arrangement sealing between said adjacent heat transfer plates to define a flow channel between said adjacent heat transfer plates through which a fluid flows, and said gasket arrangement being subjected to a number of specific outer conditions during operation of the plate heat exchanger, the method comprising: evaluating a test object located outside the plate heat exchanger, but in fluid communication with the heat exchanger, to subject the test object to at least one of said specific outer conditions, and the evaluating of the test object being performed to indirectly assess the gasket pressure of the gasket arrangement.

11. A method according to claim 10, comprising clamping the test object between a first and a second surface, the first and second surfaces being surfaces different from surfaces of the two adjacent heat transfer plates.

12. A method according to claim 11, further comprising monitoring a first pressure between the test object and the first surface and using the first pressure to indirectly assess the gasket pressure of the gasket arrangement.

13. A method according to claim 12, further comprising monitoring a second pressure of a media at least partly surrounding the test object and using a difference between the first pressure and the second pressure to indirectly assess the gasket pressure of the gasket arrangement.

14. A method according to claim 10, comprising providing the test object at least partly arranged inside a feed pipe of a fluid passing through the plate heat exchanger to expose it to the fluid, the feed pipe being in flow communication with the plate heat exchanger, which test object is insertable into the feed pipe through a connection in a wall of the feed pipe.

15. A plate heat exchanger in combination with a device for assessing a gasket pressure of a gasket between two adjacent heat transfer plates of the plate heat exchanger, the gasket providing a seal between the two adjacent heat transfer plates to define a flow channel between the two adjacent heat transfer plates, the gasket being positioned to be exposed to a fluid passing through the flow channel, the device for assessing the gasket pressure of the gasket comprising a test object different from and spaced away from the gasket at a position exposing the test object to the fluid, the test object and the gasket being made of the same material, and the test object being evaluatable to indirectly assess the gasket pressure of the gasket.

16. A plate heat exchanger in combination with a device according to claim 15, wherein the plate heat exchanger includes a port hole in fluid communication with an infeed pipe, the flow path passing though the infeed pipe, the test object being mounted on the infeed pipe so that the test object is contacted by the fluid in the infeed pipe before the fluid passes through the port hole and enters the flow channel between the two adjacent heat transfer plates.

17. A plate heat exchanger in combination with a device according to claim 15, wherein the test object is positioned in an interior of a holder that includes a side wall, the holder also including at least one opening in the side wall that opens into the interior of the holder.

18. A plate heat exchanger in combination with a device according to claim 17, wherein the plate heat exchanger includes a port hole in fluid communication with an infeed pipe, the flow path passing though the infeed pipe, the infeed pipe being in fluid communication with the test object in the interior of the holder by way of the at least one opening in the side wall of the holder.

19. A plate heat exchanger in combination with a device according to claim 17, wherein the test object is spaced outwardly of the gasket.

20. A plate heat exchanger in combination with a device according to claim 15, wherein the plate heat exchanger possesses an outer periphery, and the test object is spaced outwardly from the outer periphery of the plate heat exchanger.

\* \* \* \* \*